US010958826B2

(12) United States Patent
Ueno et al.

(10) Patent No.: US 10,958,826 B2
(45) Date of Patent: Mar. 23, 2021

(54) ELECTRONIC APPARATUS AND CONTROL METHOD FOR ELECTRONIC APPARATUS

(71) Applicant: CANON KABUSHIKI KAISHA, Tokyo (JP)

(72) Inventors: Daiyu Ueno, Kawasaki (JP); Takuro Miyajima, Kawasaki (JP); Koji Yoshida, Fujisawa (JP); Ryu Wakui, Tokyo (JP); Eriko Sato, Kawasaki (JP); Takeshi Kikkawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/456,393

(22) Filed: Jun. 28, 2019

(65) Prior Publication Data

US 2020/0007750 A1 Jan. 2, 2020

(30) Foreign Application Priority Data

Jun. 29, 2018 (JP) .............................. JP2018-125430

(51) Int. Cl.
*H04N 5/232* (2006.01)
*G06F 3/041* (2006.01)
*H04N 5/225* (2006.01)

(52) U.S. Cl.
CPC ....... *H04N 5/23216* (2013.01); *G06F 3/0416* (2013.01); *H04N 5/2252* (2013.01)

(58) Field of Classification Search
CPC ............. H04N 5/23216; H04N 5/2252; H04N 5/232933; H04N 5/22525; G06F 3/0416
See application file for complete search history.

(56) References Cited

U.S. PATENT DOCUMENTS 6,229,456 B1 5/2001 Engholm et al.
8,624,759 B2 * 1/2014 Maenpaa ............. H01H 25/041
341/33

(Continued)

FOREIGN PATENT DOCUMENTS

CN 103095991 A 5/2013
CN 106454065 A 2/2017
(Continued)

OTHER PUBLICATIONS

Android Explained, Mar. 1, 2017, '[YouTube] Using the Double Tap to Seek Gesture', youtube.com, [online], available from: https://www.youtube.com/watch?v=Av6eLxjwwuM [accessed Mar. 12, 2020].

(Continued)

*Primary Examiner* — Jason A Flohre
(74) *Attorney, Agent, or Firm* — Cowan, Liebowitz & Latman, P.C.

(57) ABSTRACT

An electronic apparatus comprising: a display controlling unit configured to control to display a group of candidates representing a plurality of candidates of settings with respect to a specific setting object in response to a first type of operation and to hide the group of candidates in a case where a prescribed condition is satisfied; and a control unit configured to change the specific setting object to a selected setting, by selecting one setting from a plurality of candidates including the group of candidates in response to the first type of operation, and in a case where the group of candidates is displayed, in response to a second type of operation, change the specific setting object to a specific setting associated with the second type of operation and update the display of the group of candidates so as to correspond to the changed setting.

17 Claims, 6 Drawing Sheets

(56) References Cited

U.S. PATENT DOCUMENTS

| | | | |
|---|---|---|---|
| 8,982,055 B2* | 3/2015 | Strong, IV | H04M 1/233 |
| | | | 345/169 |
| 8,982,062 B2* | 3/2015 | Bos | G06F 3/04883 |
| | | | 345/173 |
| 2004/0085457 A1* | 5/2004 | Thorland | H04N 1/0035 |
| | | | 348/220.1 |
| 2006/0050167 A1* | 3/2006 | Skurdal | H04N 1/00458 |
| | | | 348/333.05 |
| 2007/0098395 A1* | 5/2007 | Battles | G03B 17/02 |
| | | | 396/299 |
| 2008/0122945 A1* | 5/2008 | Ahonen | H03K 17/962 |
| | | | 348/223.1 |
| 2010/0296806 A1* | 11/2010 | Seo | H04N 5/23216 |
| | | | 396/236 |
| 2011/0074671 A1 | 3/2011 | Shimosato et al. | |
| 2011/0273606 A1* | 11/2011 | Hara | H04N 5/23245 |
| | | | 348/333.02 |
| 2014/0354845 A1* | 12/2014 | Molgaard | H04N 5/23293 |
| | | | 348/222.1 |
| 2015/0077603 A1* | 3/2015 | Matsuzawa | H04N 5/367 |
| | | | 348/297 |
| 2015/0324104 A1 | 11/2015 | Frerichs et al. | |
| 2016/0191800 A1* | 6/2016 | Yoshikawa | H04N 5/23245 |
| | | | 348/220.1 |
| 2016/0309092 A1* | 10/2016 | Feinberg | G03B 13/06 |
| 2017/0303043 A1* | 10/2017 | Young | H04N 5/2252 |
| 2017/0332008 A1* | 11/2017 | Tsuchiya | H04N 5/23222 |
| 2018/0027163 A1* | 1/2018 | Uchida | H04N 5/2351 |
| | | | 348/361 |

FOREIGN PATENT DOCUMENTS

| | | |
|---|---|---|
| JP | 2002-163052 A | 6/2002 |
| JP | 2004-012842 A | 1/2004 |
| WO | 2017/090121 A1 | 6/2017 |

OTHER PUBLICATIONS

The above patent documents were cited in a U.K. Search Report dated Mar. 16, 2020, which is enclosed, that issued in the corresponding U.K. Patent Application No. 1908988.7.

The above documents were cited in a Jan. 4, 2021 Chinese Office Action, which is enclosed with an English Translation, that issued in Chinese Patent Application No. 201910574527.8.

* cited by examiner

ELECTRONIC APPARATUS AND CONTROL METHOD FOR ELECTRONIC APPARATUS

BACKGROUND OF THE INVENTION

Field of the Invention

The present invention relates to an electronic apparatus and a control method for an electronic apparatus.

Description of the Related Art

Conventionally, as means for configuring (changing) settings of an electronic apparatus, a proposed method includes an operation for changing a setting of a given setting item (setting object) in accordance with an operation amount and an operation for changing the setting of the setting item to a single setting defined in advance. Specifically, with the operation for changing a setting in accordance with an operation amount, for example, display brightness of an electronic apparatus can be changed from 100 nits to any of four candidates including 110 nits, 120 nits, 130 nits, and 140 nits. In addition, with the operation for changing to a setting defined in advance, for example, the display brightness can be set to 200 nits even if 200 nits is not one of the candidates of the operation for changing a setting in accordance with an operation amount and regardless of a current display brightness of the electronic apparatus.

Japanese Patent Application Laid-open No. 2004-12842 proposes a parameter setting apparatus (electronic apparatus) including an operation for changing only a specific setting value among a group of setting values in accordance with an operation amount and an operation for changing the group of setting values to a setting defined in advance. Specifically, an individual mode for changing a setting value in accordance with an amount of rotation of a knob provided in the parameter setting apparatus and an interlocked mode for changing a setting value to a prescribed setting value in a list of a selectable library are proposed.

SUMMARY OF THE INVENTION

However, in Japanese Patent Application Laid-open No. 2004-12842, since the two change operations must be respectively performed on different display screens, when a user performs one change operation and subsequently performs the other change operation, a display screen switches to a different display screen. In other words, conventionally, when setting an identical setting item by a plurality of different operations, a user may not be able to readily comprehend a change to the setting.

In consideration thereof, an object of the present invention is to provide an electronic apparatus which enables a user to readily comprehend a change to a setting when setting an identical item by a plurality of different operations.

An aspect of the present invention is an electronic apparatus comprising:
a memory and at least one processor and/or at least one circuit to perform the operations of the following unit:
a display controlling unit configured to control
to display a group of candidates representing a plurality of candidates of settings with respect to a specific setting object in response to a first type of operation by a user and
to hide the group of candidates in a case where a prescribed condition is satisfied; and
a control unit configured to change the specific setting object to a selected setting, by selecting one setting from a plurality of candidates including the group of candidates in response to the first type of operation, and
in a case where the group of candidates is displayed, in response to a second type of operation by a user that differs from the first type of operation, change the specific setting object to a specific setting associated with the second type of operation in advance and update the display of the group of candidates so as to correspond to the changed setting.

According to the present invention, a user can more readily comprehend a change to a setting when setting an identical item by a plurality of different operations.

Further features of the present invention will become apparent from the following description of exemplary embodiments with reference to the attached drawings.

DESCRIPTION OF THE EMBODIMENTS

External View of Digital Camera 100

Figure 1A:
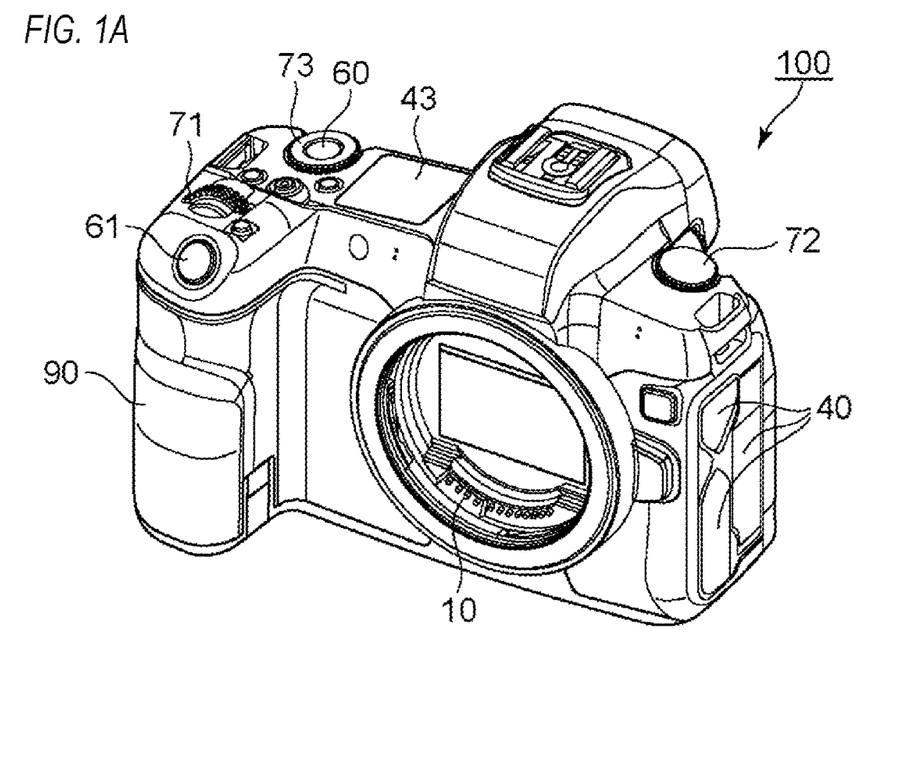
FIGS. 1A and 1B are external views of a digital camera according to an embodiment.
Figure 1B:
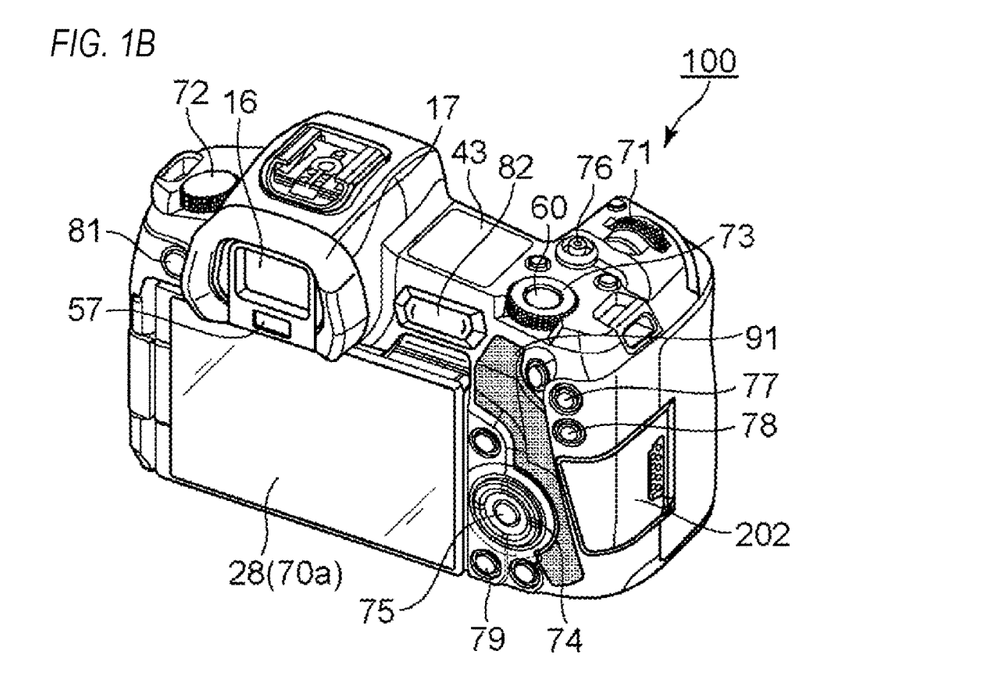

Hereinafter, a preferred embodiment of the present invention will be described with reference to the drawings. FIGS. 1A and 1B show external views of a digital camera 100 as an example of an apparatus to which the present invention can be applied. FIG. 1A is a front perspective view of the digital camera 100, and FIG. 1B is a rear perspective view of the digital camera 100.

A display unit 28 is a display unit provided on a rear surface of the digital camera 100 for displaying images and various types of information. A touch panel 70a is capable of detecting a touch operation performed on a display surface (a touch operation surface) of the display unit 28. A finder outer display unit 43 is a display unit provided on an upper surface of the digital camera 100 for displaying various setting values of the digital camera 100 including a shutter speed and an aperture. A shutter button 61 is an operation member for issuing a photography instruction. A mode changeover switch 60 is an operation member for switching between various modes. A terminal cover 40 is a cover for protecting a connector (not shown) to which is connected a connection cable or the like for connecting the digital camera 100 to an external device.

A main electronic dial 71 is a rotating operation member and, by turning the main electronic dial 71, setting values such as a shutter speed and an aperture can be changed. A power switch 72 is an operation member for switching power of the digital camera 100 on and off. A sub electronic dial 73 is a rotating operation member and, by turning the sub electronic dial 73, operations such as moving a selection frame (cursor) and image feeding can be performed. A four-way key 74 is configured such that upper, lower, left, and right portions thereof are respectively depressible, and enables a process corresponding to a depressed portion of the four-way key 74 to be performed. A SET button 75 is a push button mainly used to determine a selected item.

A moving image button 76 is used to issue instructions to start or stop moving image photography (recording). An AE lock button 77 is a push button, and by depressing the AE lock button 77 in a photography standby state, an exposure state can be fixed. An enlargement button 78 is an operation button for switching an enlargement mode on and off in a live view display (LV display) in a photography mode. By operating the main electronic dial 71 after switching on the enlargement mode, a live view image (LV image) can be enlarged or reduced. In a playback mode, the enlargement button 78 functions as an operation button for enlarging a playback image or increasing an enlargement rate of the playback image. A playback button 79 is an operation button for switching between the photography mode and the playback mode. By depressing the playback button 79 in the photography mode, a transition can be made to the playback mode and a latest image among images recorded in a recording medium 200 (to be described later) can be displayed on the display unit 28. A menu button 81 is a push button used for performing an instruction operation to display a menu screen and, when the menu button 81 is pushed, a menu screen enabling various settings to be performed is displayed on the display unit 28. A user can intuitively perform various settings using the menu screen displayed on the display unit 28, the four-way key 74, and the SET button 75.

A touch bar 82 (multi-function bar: M-Fn bar) is a linear touch operation member (line touch sensor) capable of accepting a touch operation. The touch bar 82 is arranged at a position where a touch operation can be performed on the touch bar 82 (where the touch bar 82 is touchable) by the thumb of a right hand gripping a grip portion 90 in a normal grip (a grip recommended by a manufacturer). The touch bar 82 is an accepting unit capable of accepting a tap operation (an operation involving touching and then releasing the touch without movement within a prescribed period of time), leftward and rightward slide operations (operations involving touching and then moving a touch position while maintaining the touch), and the like with respect to the touch bar 82. The touch bar 82 is an operation member that differs from the touch panel 70a and is not equipped with a display function.

A communication terminal 10 is a communication terminal used by the digital camera 100 to communicate with a lens unit 150 (to be described later; attachable and detachable). An eyepiece 16 is an eyepiece of an eyepiece finder 17 (a look-in finder), and the user can visually confirm, via the eyepiece 16, an image displayed on an internal EVF 29 (to be described later). An eye proximity detecting unit 57 is an eye proximity detection sensor that detects whether or not the eye of the user (photographer) is approaching the eyepiece 16. A lid 202 is a lid of a slot in which the recording medium 200 (to be described later) is stored. The grip portion 90 is a holding portion configured in a shape readily gripped by the right hand of the user when holding the digital camera 100. The shutter button 61 and the main electronic dial 71 are arranged at positions where the shutter button 61 and the main electronic dial 71 can be operated by the index finger of the right hand in a state where the digital camera 100 is held by gripping the grip portion 90 with the little finger, the ring finger, and the middle finger of the right hand. In addition, the sub electronic dial 73 and the touch bar 82 are arranged at positions where the sub electronic dial 73 and the touch bar 82 can be operated by the right thumb in a same state. A thumb rest portion 91 (a thumb standby position) is a grip member provided at a location where the thumb of the right hand gripping the grip portion 90 can be readily placed on a rear side of the digital camera 100 in a state where none of the operation members are being operated. The thumb rest portion 91 is constituted by a rubber member or the like in order to enhance holding force (grip feeling).

Configuration Block Diagram of Digital Camera 100

Figure 2:
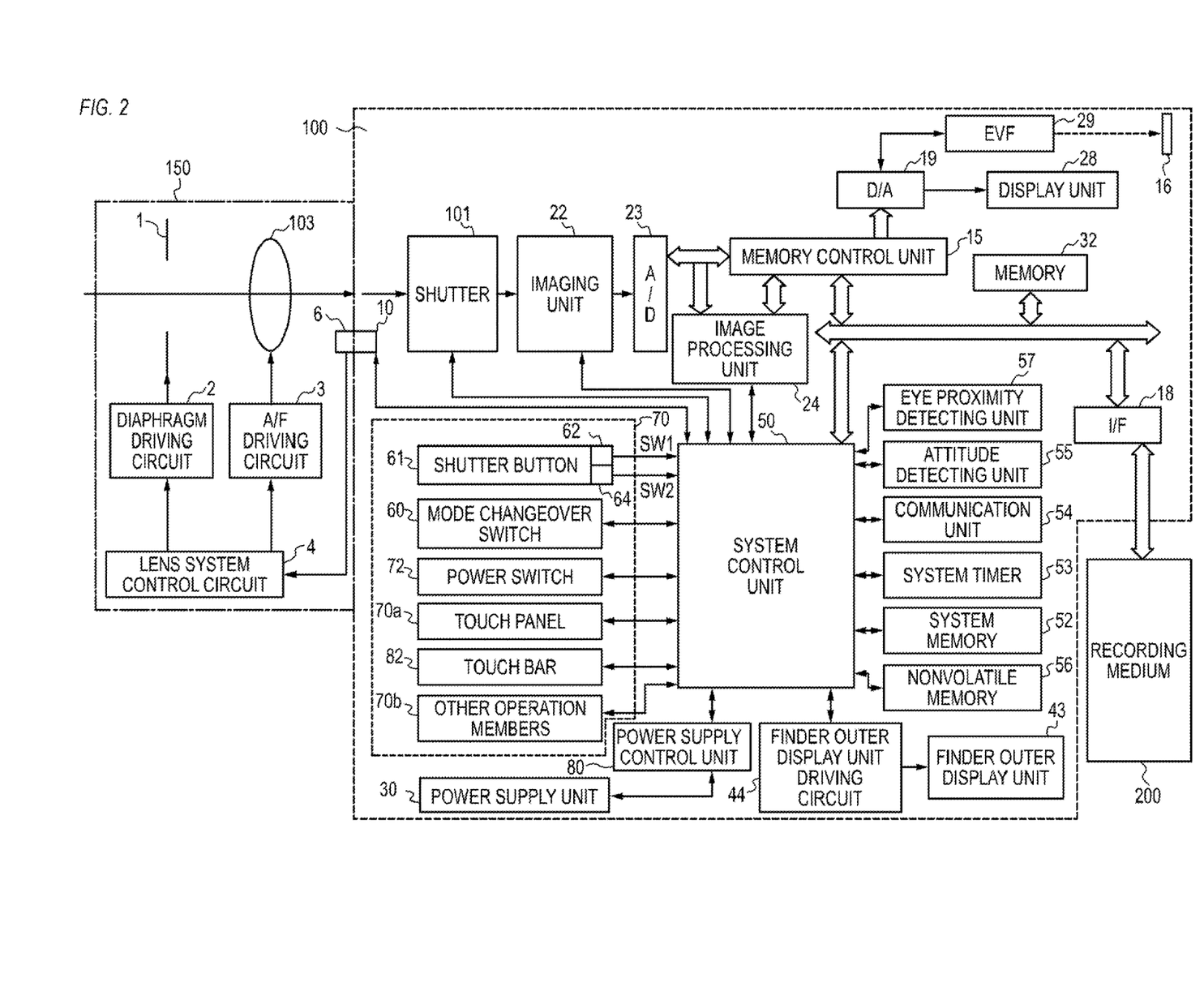
FIG. 2 is a block diagram of the digital camera according to the present embodiment.

FIG. 2 is a block diagram showing a configuration example of a digital camera 100. The lens unit 150 is a lens unit mounted with a replaceable photographing lens. While the lens 103 is usually configured by a plurality of lenses, in FIG. 2, the lens 103 is shown simplified with only one lens. A communication terminal 6 is a communication terminal used by the lens unit 150 to communicate with the digital camera 100, and a communication terminal 10 is a communication terminal used by the digital camera 100 to communicate with the lens unit 150. The lens unit 150 communicates with a system control unit 50 via the communication terminals 6 and 10. In addition, the lens unit 150 controls a diaphragm 1 via a diaphragm driving circuit 2 using an internal lens system control circuit 4. Furthermore, the lens unit 150 performs focusing by displacing a position of the lens 103 via an AF driving circuit 3 using the lens system control circuit 4.

A shutter 101 is a focal plane shutter capable of freely controlling an exposure time of an imaging unit 22 under the control of the system control unit 50.

The imaging unit 22 is an imaging element constituted by a CCD, a CMOS element, or the like which converts an optical image into an electrical signal. The imaging unit 22 may have an imaging surface phase difference sensor that outputs information on a defocusing amount to the system control unit 50. An A/D converter 23 converts an analog signal output from the imaging unit 22 into a digital signal.

An image processing unit 24 performs prescribed processes (pixel interpolation, a resizing process such as reduction, a color conversion process, and the like) on data from the A/D converter 23 or data from a memory control unit 15. In addition, the image processing unit 24 performs a prescribed computing process using image data of a captured image, and the system control unit 50 performs exposure control and ranging control based on a computation result obtained by the image processing unit 24. Accordingly, processes such as an AF (automatic focusing) process, an AE (automatic exposure) process, and an EF (preliminary light emission before flash) process in a TTL (through-the-lens) system are performed. The image processing unit 24 further performs a prescribed computing process using image data of a captured image and performs an AWB (automatic white balance) process in the TTL system based on an obtained computation result.

Output data from the A/D converter 23 is written into a memory 32 via the image processing unit 24 and the memory control unit 15. Alternatively, output data from the A/D converter 23 is written into the memory 32 via the memory control unit 15 without involving the image processing unit 24. The memory 32 stores image data obtained by the imaging unit 22 and converted into digital data by the A/D converter 23 and image data to be displayed on the display unit 28 and the EVF 29. The memory 32 has sufficient storage capacity for storing a prescribed number of still images, a prescribed time's worth of moving images, and audio.

In addition, the memory 32 also doubles as a memory (video memory) for image display. A D/A converter 19 converts data for image display stored in the memory 32 into an analog signal and supplies the analog signal to the display unit 28 and the EVF 29. In this manner, image data for display having been written into the memory 32 is displayed by the display unit 28 and the EVF 29 via the D/A converter 19. The display unit 28 and the EVF 29 each perform display in accordance with the analog signal from the D/A converter 19 on a display such as an LCD, an organic EL, or the like. A live view display (LV) can be performed by converting digital signals subjected to A/D conversion by the A/D converter 23 and accumulated in the memory 32 into analog signals with the D/A converter 19, and sequentially transmitting and displaying the analog signals to the display unit 28 or the EVF 29. Hereinafter, an image displayed in a live view display will be referred to as a live view image (LV image).

Various setting values of the camera including a shutter speed and an aperture are displayed on the finder outer display unit 43 via a finder outer display unit driving circuit 44.

A nonvolatile memory 56 is an electrically erasable and recordable memory and is, for example, an EEPROM. Constants, a program, and the like for operations of the system control unit 50 are recorded in the nonvolatile memory 56. In this case, the program refers to a program for executing the various flow charts described later in the present embodiment.

The system control unit 50 is a control unit which is constituted by at least one processor or circuit and which controls the entire digital camera 100. The system control unit 50 realizes the respective processes of the present embodiment (to be described later) by executing a program recorded in the nonvolatile memory 56 described earlier. A system memory 52 is, for example, a RAM, and the system control unit 50 deploys constants and variables for the operations of the system control unit 50, the program read from the nonvolatile memory 56, and the like on the system memory 52. In addition, the system control unit 50 also performs display control by controlling the memory 32, the D/A converter 19, the display unit 28, and the like.

A system timer 53 is a time measuring unit for measuring time used in various control and time according to an internal clock.

A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter based on detection results thereof and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

A communication unit 54 transmits and receives video signals and audio signals to and from an external device connected wirelessly or by a wired cable. The communication unit 54 is also capable of connecting to a wireless LAN (Local Area Network) or the Internet. In addition, the communication unit 54 is also capable of communicating with an external device by Bluetooth (registered trademark) or Bluetooth Low Energy. The communication unit 54 is capable of transmitting images (including LV images) captured by the imaging unit 22 and images recorded on the recording medium 200 and receiving image data and various other types of information from an external device.

An attitude detecting unit 55 detects an attitude of the digital camera 100 relative to a direction of gravitational force. Based on the attitude detected by the attitude detecting unit 55, a determination can be made as to whether an image photographed by the imaging unit 22 is an image photographed while holding the digital camera 100 horizontally or an image photographed while holding the digital camera 100 vertically. The system control unit 50 can add direction information in accordance with the attitude detected by the attitude detecting unit 55 to an image file of the image captured by the imaging unit 22 and record a rotated version of the image. An acceleration sensor, a gyro sensor, or the like can be used as the attitude detecting unit 55. A motion (a pan, a tilt, an uplift, whether stationary or not, and the like) of the digital camera 100 can be detected using the acceleration sensor or the gyro sensor that is the attitude detecting unit 55.

The eye proximity detecting unit 57 is an eye proximity detection sensor which detects (approach detection) an approach (eye approach) and a separation (eye separation) of an eye (object) with respect to the eyepiece 16 of the eyepiece finder 17 (hereinafter, simply referred to as a "finder"). The system control unit 50 switches between setting the display unit 28 and the EVF 29 to display (displayed state) and hide (hidden state) in accordance with the state detected by the eye proximity detecting unit 57. More specifically, at least when a current state is the photography standby state and when a display destination is to be automatically switched, the display unit 28 as the display destination is set to display and the EVF 29 is set to hide when unapproached by the eye. In addition, during an eye approach, the EVF 29 as the display destination is set to display and the display unit 28 is set to hide. As the eye proximity detecting unit 57, for example, an infrared proximity sensor can be used to detect an approach of any object with respect to the eyepiece 16 of the finder 17 incorporating the EVF 29. When an object approaches, infrared light projected from a light projecting portion (not shown) of the eye proximity detecting unit 57 is reflected by the object and received by a light receiving portion (not shown) of the infrared proximity sensor. Based on an amount of received infrared light, how close the object is from the eyepiece 16 (eye proximity distance) can be determined. In this manner, the eye proximity detecting unit 57 performs eye proximity detection in which a distance of approach of an object with respect to the eyepiece 16 is detected. An eye approach is to be detected when an object having approached the eyepiece 16 to within a prescribed distance from an eye-unapproached state (unapproached state) is detected. An eye separation is to be detected when an object of which an approach has been detected recedes to a prescribed distance or more from an eye-approached state (approached state). A threshold for detecting an eye approach and a threshold for detecting an eye separation may differ from each other by, for example, setting a hysteresis. In addition, after detecting an eye approach, an eye-approached state is assumed until an eye separation is detected. After detecting an eye separation, an eye-unapproached state is assumed until an eye approach is detected. It should be noted that an infrared proximity sensor is simply an example and other sensors may be adopted as the eye proximity detecting unit 57 as long as an approach by an eye or an object which can be regarded as an eye approach can be detected.

An operating unit 70 is an input unit for accepting an operation (a user operation) by the user and is used to input various operation instructions to the system control unit 50. As shown in FIG. 2, the operating unit 70 includes the mode changeover switch 60, the shutter button 61, the power switch 72, the touch panel 70a, and the touch bar 82. As other operation members 70b, the operating unit 70 also includes the main electronic dial 71, the sub electronic dial 73, the four-way key 74, the SET button 75, the moving image button 76, the AE lock button 77, the enlargement button 78, the playback button 79, and the menu button 81.

The mode changeover switch 60 switches an operating mode of the system control unit 50 to any of a still image photography mode, a moving image photography mode, a playback mode, and the like. Modes included in the still image photography mode are an automatic photography mode, an automatic scene determination mode, a manual mode, an aperture priority mode (Av mode), a shutter speed priority mode (Tv mode), and a program AE mode (P mode). Other available modes include various scene modes that constitute photography settings for different photography scenes as well as custom modes. Using the mode changeover switch 60, the user can directly switch to any of these modes. Alternatively, after temporarily switching to a list screen of the photography mode using the mode changeover switch 60, another operation member may be used to selectively switch to any of a plurality of displayed modes. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (a photography preparation instruction) and generates a first shutter switch signal SW1. In accordance with the first shutter switch signal SW1, the system control unit 50 starts a photography preparation operation of an AF (automatic focusing) process, an AE (automatic exposure) process, an AWB (automatic white balance) process, an EF (preliminary light emission before flash) process, and the like. The second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of a photography process from reading a signal from the imaging unit 22 to writing a captured image into the recording medium 200 as an image file.

The touch panel 70a and the display unit 28 can be integrally configured. For example, the touch panel 70a is configured such that transmittance of light does not obstruct display by the display unit 28 and is mounted to an upper layer of a display surface of the display unit 28. Subsequently, an input coordinate on the touch panel 70a and a display coordinate on the display surface of the display unit 28 are associated with each other. Accordingly, a GUI (graphical user interface) can be provided which enables the user to feel as if a screen displayed on the display unit 28 can be directly manipulated. The system control unit 50 is capable of detecting the following operations to the touch panel 70a or the following states of the touch panel 70a.

A new touch on the touch panel 70a by a finger or a stylus previously not in touch with the touch panel 70a or, in other words, a start of a touch (hereinafter, referred to as a touch-down)

A state where the touch panel 70a is being touched by a finger or a stylus (hereinafter, referred to as a touch-on)

A finger or a stylus moving while in touch with the touch panel 70a (hereinafter, referred to as a touch-move)

A separation (release) from the touch panel 70a by a finger or a stylus previously in touch with the touch panel 70a or, in other words, an end of a touch (hereinafter, referred to as a touch-up)

A state where nothing is touching the touch panel 70a (hereinafter, referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger or a stylus touches the touch panel 70a through an internal bus. In addition, based on the notified information, the system control unit 50 determines what kind of operation (touch operation) has been performed on the touch panel 70a. With respect to a touch-move, a movement direction of a finger or a stylus moving on the touch panel 70a can also be determined for each of a vertical component and a horizontal component on the touch panel 70a based on a change in the position coordinate. When a touch-move of a prescribed distance or more is detected, it is determined that a slide operation has been performed. An operation involving quickly moving a finger on the touch panel 70a for a certain distance while keeping the finger in touch with the touch panel 70a and then releasing the finger is referred to as a flick. In other words, a flick is an operation in which a finger quickly traces the surface of the touch panel 70a as though flicking at the touch panel 70a. A determination that a flick has been performed can be made (a determination that a flick has occurred following a slide operation can be made) when a detection of a touch-move of a prescribed distance or more at a prescribed speed or more is followed by a detection of a touch-up. Furthermore, a touch operation involving touching (multi-touching) a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). The touch panel 70a may adopt any touch panel system among various systems including a resistive film system, a capacitance system, a surface acoustic wave system, an infrared system, an electromagnetic induction system, an image recognition system, and an optical sensor system. Any of a system in which a touch is detected when contact is made with the touch panel and a system in which a touch is detected when a finger or a stylus approaches the touch panel may be adopted.

In addition, the system control unit 50 is capable of detecting the following operations to the touch bar 82 or the following states of the touch bar 82.

- A new touch on the touch bar 82 by a finger previously not in touch with the touch bar 82 or, in other words, a start of a touch (hereinafter, referred to as a touch-down)
- A state where the touch bar 82 is being touched by a finger (hereinafter, referred to as a touch-on)
- A finger moving while in touch with the touch bar 82 (hereinafter, referred to as a touch-move)
- A separation (release) from the touch bar 82 by a finger previously in touch with the touch bar 82 or, in other words, an end of a touch (hereinafter, referred to as a touch-up)
- A state where nothing is touching the touch bar 82 (hereinafter, referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger touches the touch bar 82 through an internal bus and, based on the notified information, the system control unit 50 determines what kind of operation (touch operation) has been performed on the touch bar 82. With respect to a touch-move, a movement in a horizontal direction (left-right direction) on the touch bar 82 is detected. When a movement of a touch position by a prescribed distance or more (a movement of a prescribed amount or more) is detected, it is determined that a slide operation has been performed. A determination that a tap operation has been performed is to be made when an operation is performed in which the touch bar 82 is touched by a finger and the touch is released within a prescribed period of time without performing a slide operation. In the present embodiment, the touch bar 82 is assumed to be a capacitance-system touch sensor. Alternatively, touch sensors of other systems including a resistive film system, a surface acoustic wave system, an infrared system, an electromagnetic induction system, an image recognition system, and an optical sensor system may be used as the touch bar 82.

Display Operation of Digital Camera

Hereinafter, a display operation of the digital camera 100 according to the present embodiment will be described. In the present embodiment, when a tap operation (a second type of operation) with respect to the touch bar 82 is performed within a prescribed period of time after a slide operation (a first type of operation) had been performed with respect to the touch bar 82, the system control unit 50 displays a setting changed (set) by the tap operation on a gauge (group of candidates). Accordingly, the setting changed by the tap operation is displayed on the gauge (meter display, scale display) which is normally only displayed when a slide operation is performed with respect to an operation surface of the touch bar 82. Therefore, a user can readily comprehend a change in the setting. The touch bar 82 is arranged adjacent to the sub electronic dial 73 and to the thumb rest portion 91 where the thumb is to be positioned when holding the digital camera 100 by gripping the grip portion 90 with the right hand.

Figure 3:
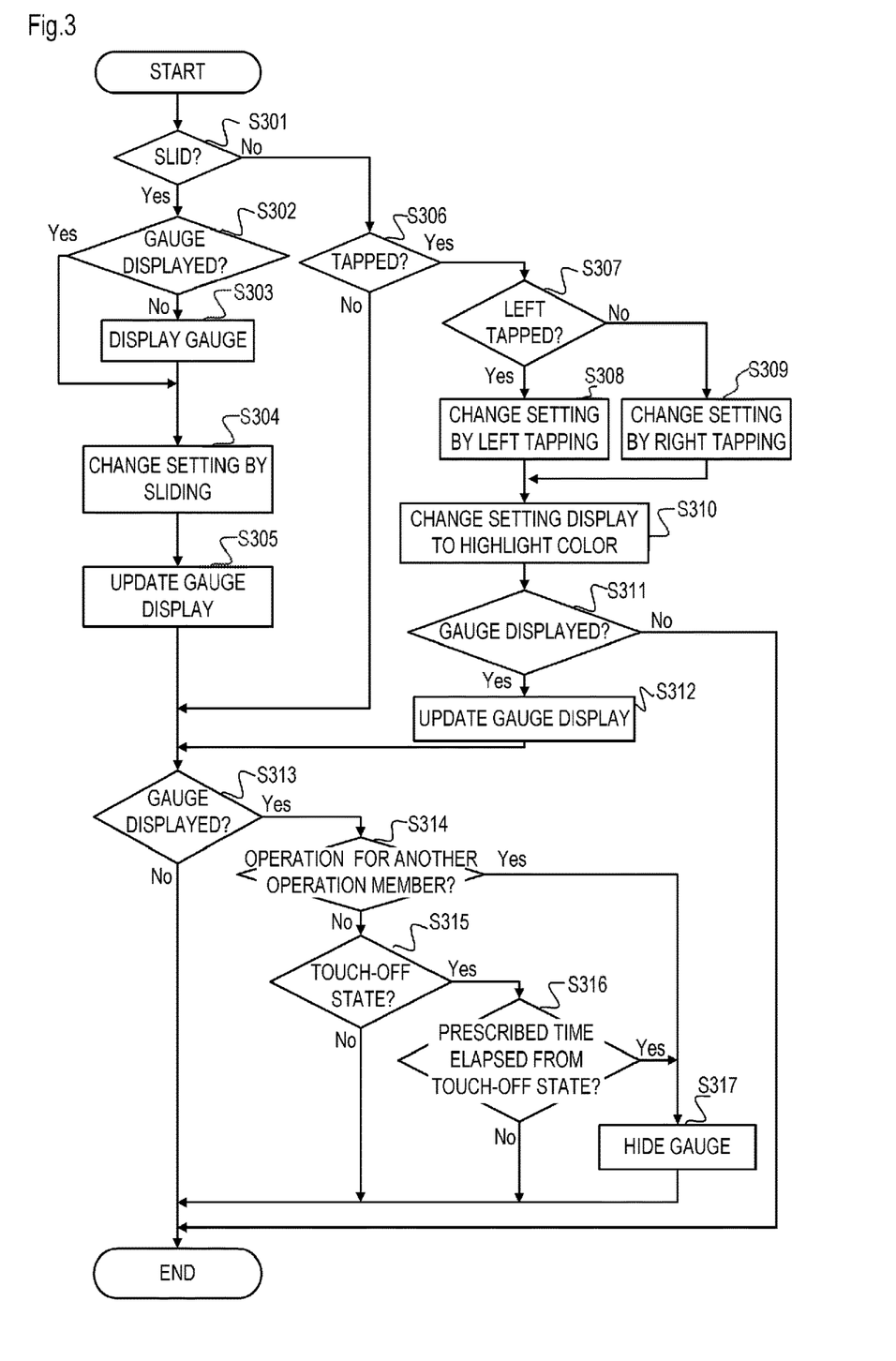
FIG. 3 is a flow showing a process in accordance with operations with respect to a touch bar according to the present embodiment.
Figure 5A:
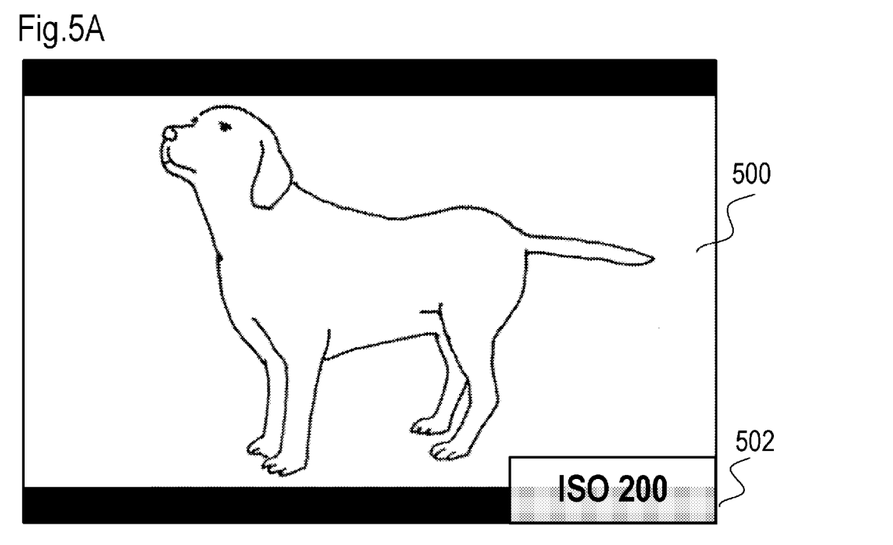
FIGS. 5A to 5D are diagrams showing display examples due to operations with respect to the touch bar according to the present embodiment.

Hereinafter, using the flow chart shown in FIG. 3, a process related to operations with respect to the touch bar 82 according to the present embodiment will be described in detail. The flow chart shown in FIG. 3 is executed as the system control unit 50 deploys a program read from the nonvolatile memory 56 onto the system memory 52. When the digital camera 100 is activated in the photography mode, capture of a live view image by the imaging unit 22 is started and the display unit 28 or the EVF 29 initially displays a photography standby screen such as that shown in FIG. 5A. FIG. 5A shows an example in which the display unit 28 or the EVF 29 displays, superimposed on a live view image (LV image) 500, ISO sensitivity currently set to an ISO sensitivity display region 502. Alternatively, the display unit 28 or the EVF 29 may display other photographic settings (a shutter speed, an aperture, an exposure correction value, an image size, or the like). However, a gauge 501 (to be described later) is not displayed in an initial state. The process of the flow chart shown in FIG. 3 is started in a state where the photography standby screen is displayed. In addition, the system control unit 50 repetitively executes the process of the flow chart shown in FIG. 3 at a prescribed period (predetermined period) during photography standby. Alternatively, the system control unit 50 may start the process of the flow chart when an operation with respect to the touch bar 82 is performed, when a prescribed period (predetermined period) of time lapses in a touch-off state with respect to the touch bar 82, when an operation with respect to the operating unit 70 other than the touch bar 82 is performed, or the like.

The present flow chart represents an example in which the system control unit 50 changes (sets) ISO sensitivity as a setting item (a setting object) in response to a slide operation or a tap operation with respect to the touch bar 82. It should be noted that the setting object is not limited to ISO sensitivity and the present embodiment can also be applied to other setting objects. For example, a shutter speed, white balance, an object or system of focusing, an aperture, AF (automatic focusing), zoom magnification, or a volume of the digital camera 100 may be changed (set). In addition, the present flow chart can also be applied to a change operation of images that are displayed by playback. For example, a slide operation with respect to the touch bar 82 may enable one image to be displayed on the display unit 28 to be set from a plurality of image options, and a tap operation may enable full-screen display of an image following an image currently displayed on the display unit 28 to be performed. When setting an image to be displayed by a slide operation, the image currently being displayed in an order of file numbers can even be switched to an image further down the order than the image following the currently-displayed image by one slide operation in accordance with a slide movement amount. In addition, when setting an image to be displayed by a tap operation, the image to be displayed in accordance with the tap operation is not limited to a next image. It is also possible to display (in other words, perform jump-playback of) a 10th subsequent image, a 100th subsequent image, a top image of a next photography date, a top image of an identical photography date or a previous photography date, or the like. In other words, a slide operation with respect to the touch bar 82 may enable one setting to be selected from a plurality of options (candidates), and a tap operation with respect to the touch bar 82 may enable one setting associated with the tap operation in advance to be configured.

Figure 4A:
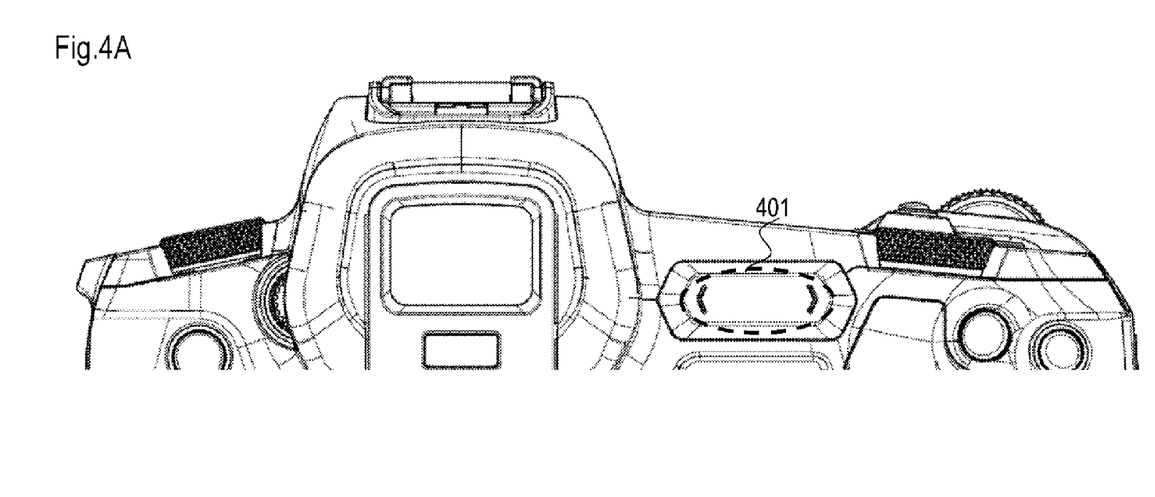
FIGS. 4A and 4B are diagrams illustrating operations with respect to the touch bar according to the present embodiment.

In S301, the system control unit 50 determines whether or not a slide operation with respect to the touch bar 82 has been performed. When the system control unit 50 determines that a slide operation has been performed, the system control unit 50 makes a transition to S302, but when the system control unit 50 determines that a slide operation has not been performed, the system control unit 50 makes a transition to S306. At this point, the system control unit 50 detects a movement amount and a movement direction of a finger within an effective range on the touch bar 82. In addition, an example of an effective range 401 is shown in FIG. 4A. While it is assumed that the effective range on the touch bar 82 is an entire touch detection surface of the touch bar 82 in the present embodiment, the effective range is not limited thereto and may be, for example, within a prescribed distance from a center of the touch bar 82 or may be an arbitrary range.

In S302, the system control unit 50 determines whether or not the gauge 501 indicating a group of candidates of setting values of ISO sensitivity including (indicating) a current ISO sensitivity setting value is displayed on the display unit 28. Specifically, for example, the system control unit 50 determines whether or not a timer constituting a condition to hide the gauge 501 of ISO sensitivity shown in FIG. 5B has expired. The system control unit 50 determines that the gauge 501 is not displayed when the timer has expired (not measuring time) but determines that the gauge 501 is being displayed when the timer has not expired and is measuring time. The gauge 501 of ISO sensitivity shown in FIG. 5B displays a lineup of a plurality of candidates of setting values of ISO sensitivity which can be selected (can be set) by the user. In addition, a value of 400 indicated above a location depicted by a bold line (in other words, a center of the gauge) among graduation marks engraved by vertical lines on the gauge 501 represents a current setting value of ISO sensitivity. When the system control unit 50 determines that the gauge 501 is displayed, the system control unit 50 makes a transition to S304, but when the system control unit 50 determines that the gauge 501 is not displayed, the system control unit 50 makes a transition to S303. The gauge 501 and the ISO sensitivity display region 502 are desirably displayed on a right side or a lower side instead of a center of a display screen so that visibility of a captured image (an LV image) or the like is not impeded.

Figure 5B:
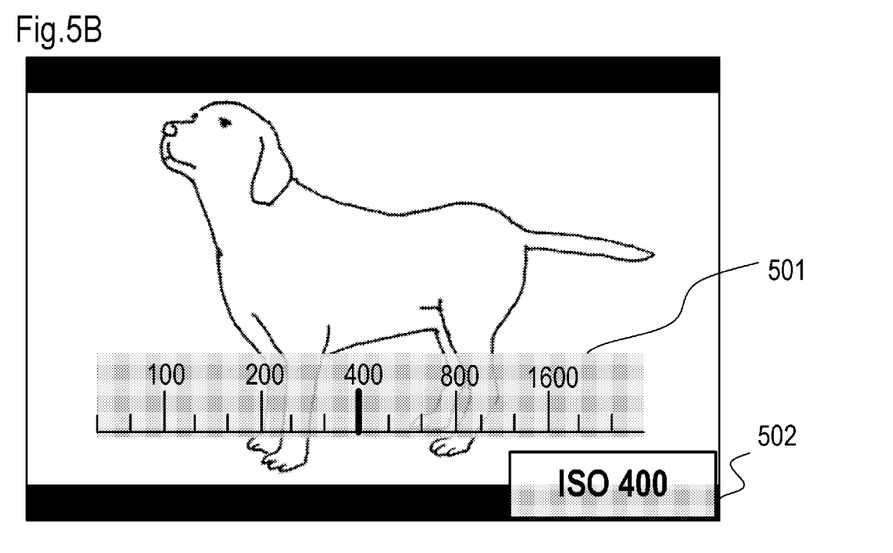

In S303, the system control unit 50 starts display of the gauge 501 on the display unit 28 or the EVF 29. FIG. 5B shows a display example of a state where the gauge 501 is displayed due to a slide operation performed from right to left from a state where the ISO sensitivity is set to 200. Display of the gauge 501 is started in accordance with sliding performed with respect to the touch bar 82. Subsequently, when sliding is performed toward the right (an operation in which a touched position moves from left to right), an animation display of the gauge 501 is performed which involves the gauge 501 scrolling and moving to the right in response to the sliding. Accordingly, respective numerical values and graduation marks in the gauge move from right to left and a value corresponding to the graduation mark positioned at the center of the gauge 501 sequentially increases. Conversely, when a slide operation is performed from left to right, an animation display of the gauge 501 is performed which involves the gauge 501 scrolling and moving from left to right in response to the sliding. Accordingly, respective numerical values and graduation marks in the gauge move from left to right and a value corresponding to the graduation mark positioned at the center of the gauge 501 sequentially decreases. The setting value is sequentially changed in accordance with a movement amount of sliding so as to assume a numerical value corresponding to the graduation mark positioned at the center. In other words, an amount of change to the setting value is in accordance with a movement direction and a movement amount of sliding. For example, when the ISO sensitivity is set to 200 in a state where the gauge 501 is not displayed as shown in FIG. 5A, a slide operation with a small movement amount is performed to the left. As a result, the gauge 501 is displayed, a scroll display is performed so that the value positioned at the center moves from 200 to 400, and a state is created where the ISO sensitivity is set to 400 as shown in FIG. 5B. When the user moves a touched position to the left from this state so as to further increase the movement amount of the sliding without separating the touch, the setting value of ISO sensitivity increases in a sequence of 400 and ⅓ steps, 400 and ⅔ steps, 800, 800 and ⅓ steps, 800 and ⅔ steps, and so on. Once the user confirms by the gauge 501 that a desired setting value has been set, the user releases the touch and finalizes the setting value. When the movement amount of the sliding is large, the ISO sensitivity can be changed to 3200 (a setting value candidate not included in the gauge 501 at a time point of start of display) by one slide operation from the state where the ISO sensitivity is set to 200. In addition, when desiring to change the setting value by a larger amount than a maximum amount that can be changed by one slide operation (for example, when desiring to change the ISO sensitivity from 200 to 12800), the user can change the setting value by repeating a slide operation several times in an identical direction. It should be noted that, while a change of the setting value in accordance with a slide operation is to be performed in S304 and an animation display of the gauge 501 is to be performed in S305 to be described later, the change of the setting value and update of the gauge 501 are to be performed substantially at the same time.

In S304, the system control unit 50 changes the setting value of ISO sensitivity in accordance with sliding with respect to the touch bar 82. As described above, an amount of change to the setting value of ISO sensitivity is dependent on a movement amount and a movement direction of a finger within an effective range on the touch bar 82 in a slide operation. In other words, the system control unit 50 changes the setting value prior to the setting change by an amount of change in accordance with a slide operation using the setting value prior to the setting change as a starting point. Specifically, the system control unit 50 changes (sets) the setting value by selecting one of a plurality of candidates which are displayed on the gauge 501 and which include a plurality of setting candidates (a group of candidates corresponding to respective graduation marks displayed by vertical lines on the gauge 501) including the setting value prior to the change.

In S305, the system control unit 50 updates the displayed gauge 501 by performing scroll display so that a graduation mark corresponding to the set setting value of ISO sensitivity is positioned at the center in accordance with a slide operation. FIG. 5B represents a display example in a case where the ISO sensitivity is set to 400 by a slide operation. In FIG. 5B, the gauge 501 is scrolled so that a graduation mark corresponding to 400 which is the set value is positioned at the center of the gauge 501. In addition, display of the value of the ISO sensitivity display region 502 is also updated in conjunction with the scroll of the gauge 501 as to display 400 which is the set value. Unlike a case where a setting value is changed by tapping (to be described later), in a case where a setting value is changed by sliding, the ISO sensitivity display region 502 is not displayed highlighted. This is because, since it is assumed that the user's focus is on the gauge 501 during a slide operation, the user can readily become aware of a changed setting value by viewing a display of the central portion of the gauge 501. Another purpose is to prevent a situation where highlighting and displaying a region that differs from the gauge distracts the user's attention from the gauge 501 and makes it difficult to perform operations while looking at the gauge 501. The setting value change in S304 and the display update of the gauge 501 in S305 are repetitively performed so as to follow a movement of sliding as long as touch continues. Therefore, by viewing the display of the gauge 501, the user can confirm how the setting value changes in accordance with a movement amount of a slide operation. In addition, the user can perform a slide operation by adjusting a movement amount of the sliding while confirming whether or not the setting value has been changed to a desired value due to the sliding. Furthermore, the gauge 501 is displayed on the EVF 29 when an eye of the user is in contact with the finder 17. Moreover, the touch bar 82 is arranged at a position where the touch bar 82 can be readily operated by the thumb of a right hand holding the grip portion 90. Therefore, even in a photographing posture in which the user is looking into the finder 17, by performing a slide operation on the touch bar 82 without looking at the touch bar 82 but looking at the gauge 501 displayed on the EVF 29, the user can set a desired setting value with good operability. When the touch is separated after the slide operation, the system control unit 50 starts a time measurement by a timer (for example, 2 seconds) which measures a non-operation time until the gauge 501 is automatically hidden.

In S306, the system control unit 50 determines whether or not a tap operation has been performed (determines whether or not right tapping or left tapping has been performed) with respect to the touch bar 82. When the system control unit 50 determines that a tap operation has been performed, the system control unit 50 makes a transition to S307, but when the system control unit 50 determines that a tap operation has not been performed, the system control unit 50 makes a transition to S313. Even if a tap operation has been performed, when the tap operation is neither right tapping nor left tapping, the system control unit 50 makes a determination of No in S306 and advances to S313.

Figure 4B:
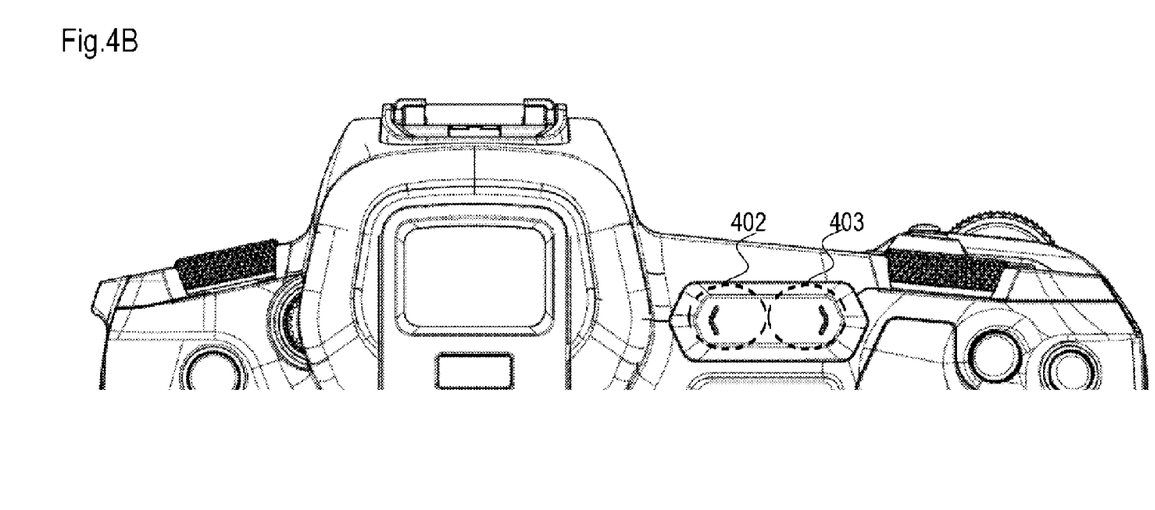

In S307, the system control unit 50 determines whether the tap operation with respect to the touch bar 82 is left tapping or right tapping. Left tapping refers to a tap operation performed on a left side (a side of the eyepiece 16) of the touch bar 82. In this case, a tap operation is an operation involving touching the touch bar 82 with a finger and the touch is released within a prescribed period of time without performing a slide operation. Specifically, left tapping is a tap operation performed in a left-side region 402 (a region to the left of a center of the touch detection surface of the touch bar 82) shown in FIG. 4B. Meanwhile, right tapping is a tap operation with respect to a right side of the touch bar 82 and, more specifically, a tap operation performed in a right-side region 403 (a region to the right of the center of the touch detection surface of the touch bar 82) shown in FIG. 4B. When the system control unit 50 determines that left tapping has been performed with respect to the touch bar 82, the system control unit 50 makes a transition to S308, but otherwise (when the system control unit 50 determines that right tapping has been performed), the system control unit 50 makes a transition to S309.

In S308, the system control unit 50 changes the setting value of ISO sensitivity by a function (a left tapping process) in accordance with left tapping with respect to the touch bar 82. Specifically, the system control unit 50 performs, with respect to the setting value of ISO sensitivity, a change (setting) associated with left tapping in advance. For example, when the user has assigned, in advance, a process of setting the setting value of ISO sensitivity to 3200 as a function corresponding to left tapping, in S308, the system control unit 50 sets the setting value of ISO sensitivity to 3200. In this case, the ISO sensitivity is set to 3200 in accordance with left tapping regardless of the setting value of ISO sensitivity having been set prior to the performance of the left tapping. In other words, even if the ISO sensitivity had been set to 12800 before left tapping is performed, performing a left tap enables the setting value to jump to and be set to 3200 while bypassing other setting values. In addition, even if the setting value corresponding to a left tap is ISO sensitivity 12800, when a left tap is performed in a state where ISO sensitivity 200 is set, the ISO sensitivity is set to 12800. In other words, a change can be made by one tap operation even to a setting value that cannot be set by sliding unless several slide operations are performed.

In S309, the system control unit 50 changes the setting value of ISO sensitivity by a function (a right tapping process) in accordance with right tapping set to the touch bar 82. Specifically, the system control unit 50 performs, with respect to the setting value of ISO sensitivity, a change (setting) to the setting value assigned as a setting value associated with right tapping in advance. For example, when ISO auto (AUTO) has been assigned to right tapping, a change is made to ISO auto (AUTO) in accordance with right tapping regardless of the ISO sensitivity having been set prior to performance of the right tap. It should be noted that the setting values to be assigned to a left tap and a right tap may be fixed values or the user may be allowed to set the setting values in advance. For example, the user can assign the setting value AUTO or an upper limit value (outside of normal) of ISO sensitivity, an upper limit value of normal ISO sensitivity, a minimum value, or the like to left tapping or right tapping. Such assignments by the user enables a specific setting value assigned to a tap operation to be set by a single tap operation without having to repetitively perform slide operations.

Figure 5C:
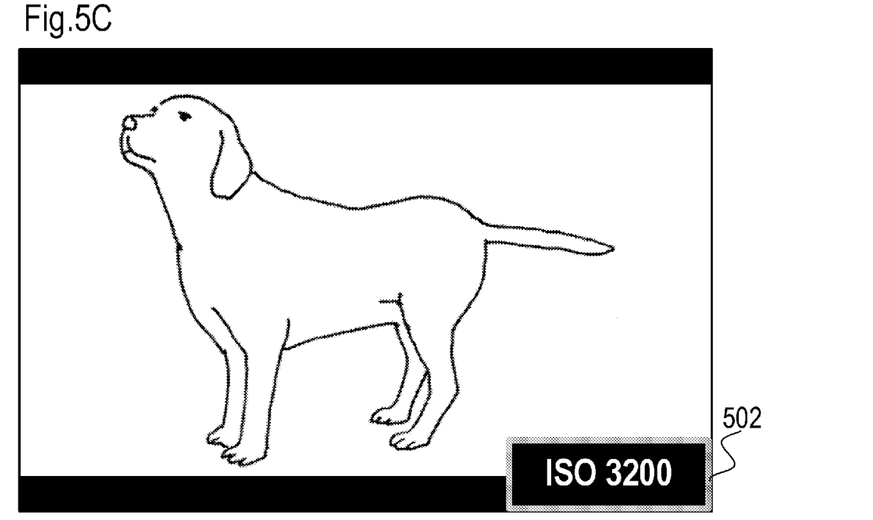

In S310, the system control unit 50 changes a display color of the setting value of ISO sensitivity in the ISO sensitivity display region 502 displayed on the display unit 28 to a highlight color. A display example of a screen on which a setting value of ISO sensitivity changed by a tap operation is displayed highlighted when the gauge 501 is not displayed is shown in FIG. 5C. FIG. 5C represents a display example in which left tapping is performed once from the state shown in FIG. 5A and ISO sensitivity 3200 assigned to left tapping is set. In response to performance of the tap operation, the system control unit 50 changes the displayed setting value and, at the same time, changes the ISO sensitivity display region 502 with a white background and black characters prior to the tap operation as shown in FIG. 5A to the ISO sensitivity display region 502 with a black background and white characters as shown in FIG. 5C. When the gauge 501 is not displayed, it is more difficult for the user to confirm what setting value has been changed by the tap operation. Therefore, the highlighted display of the ISO sensitivity display region 502 enables the user to reliably become aware that the setting value of ISO sensitivity has been changed in accordance with the tap operation. Although the background color and the character color in the ISO sensitivity display region 502 may be arbitrary colors, the colors after the tap operation are desirably more prominent than the colors before the tap operation such as the character color before the tap operation being white and the character color after the tap operation being orange.

In S311, the system control unit 50 determines whether or not a gauge indicating an identical setting item as a setting item (setting object) to be changed by a tap operation is displayed on the display unit 28. This determination is similar to the determination in S302. In the present embodiment, since the setting item is the setting value of ISO sensitivity, the system control unit 50 determines whether or not the gauge 501 is displayed on the display unit 28. When the system control unit 50 determines that the gauge 501 is displayed, the system control unit 50 makes a transition to S312, but when the system control unit 50 determines that the gauge 501 is not displayed, the process according to the present flow chart is ended. Therefore, when a tap operation is performed with respect to the touch bar 82 in a state where the gauge 501 is not displayed on the display unit 28, as shown in FIG. 5C, the system control unit 50 changes the setting value without displaying the gauge 501 on the display unit 28 and updates the display of the ISO sensitivity display region 502.

Figure 5D:
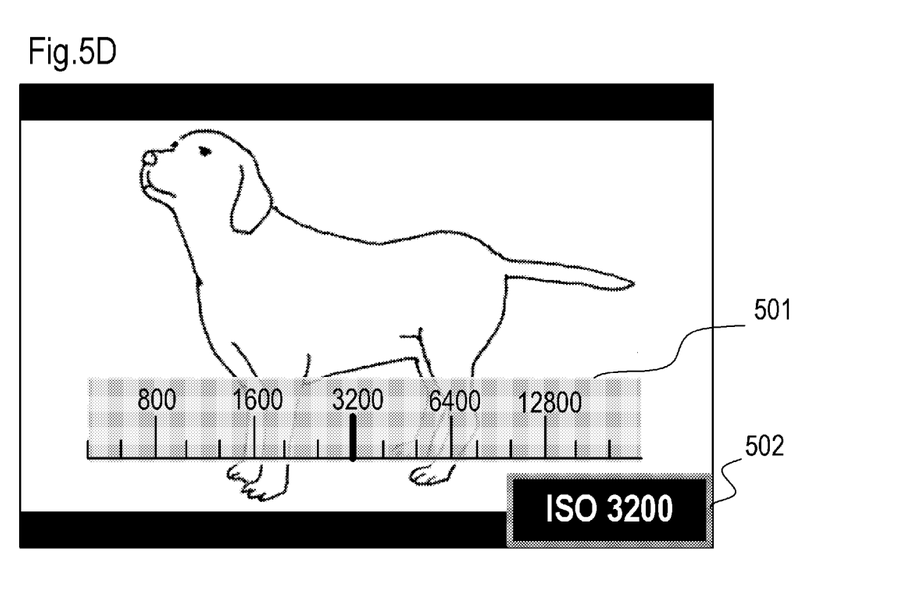

In S312, the system control unit 50 updates the gauge 501 displayed on the display unit 28 in accordance with the setting value of ISO sensitivity to be changed by a tap operation. More specifically, the system control unit 50 performs an animation display to scroll the gauge 501 so that a graduation mark corresponding to the setting value changed by the tap operation is positioned at the center of the gauge 501. FIG. 5D represents a display example in which left tapping is performed once when the gauge 501 is displayed as shown in FIG. 5B to set ISO sensitivity 3200 assigned to the left tapping. In this case, numerical values of respective setting value candidates and graduation marks displayed on the gauge 501 are scrolled to the left from the state shown in FIG. 5B and the display state shown in FIG. 5D is created. At the same time, the numerical value displayed in the ISO sensitivity display region 502 is changed to 3200 and displayed highlighted. Accordingly, the user can be made aware of the fact that the setting value changed by the tap operation is the same setting item as the setting item set by sliding and the setting value is present within a group of options which can be set by sliding. In other words, the user can be made to intuitively understand a relationship between a setting value to be changed by a slide operation and a setting value to be changed by a tap operation. Hypothetically, when a tap operation is performed in a state where the gauge 501 is displayed, only changing the setting value of ISO sensitivity without updating the gauge 501 may prevent the user from understanding that setting items set by sliding and tapping are the same. For example, when the ISO sensitivity is changed from 200 to 400 by sliding and subsequently changed to 3200 by tapping, the user may misunderstand that the ISO sensitivity is still at 400 which had been set by the sliding. In other words, the user may misunderstand that the setting changed by the tapping is a different setting item from the setting changed by the sliding. Alternatively, a user who understands that the same setting item has been changed may experience a feeling of strangeness due to the gauge 501 not scrolling. These problems can be prevented by the process of S312 by performing an animation display in which the gauge 501 is scrolled even when the setting value is changed due to a tap operation in a state where the gauge 501 is being displayed.

Meanwhile, in S311, when the system control unit 50 determines that the gauge 501 is not displayed on the display unit 28, the gauge 501 is not to be newly displayed on the display unit 28 as described above. Therefore, inhibition of visibility of the LV image 500 due to the gauge 501 being displayed can be prevented. It should be noted that, when setting the setting value to a specific value by tapping, the user need not adjust an operation amount by, for example, adjusting a movement amount of sliding to a desired value while viewing the gauge 501 as required when setting the setting value by sliding. Therefore, when the gauge 501 is not displayed, the system control unit 50 prioritizes not interfering with the visibility of the LV image 500 by not displaying the gauge 501.

In S313, the system control unit 50 determines whether or not the gauge 501 is displayed on the display unit 28. When the system control unit 50 determines that the gauge 501 is displayed, the system control unit 50 makes a transition to S314, but when the system control unit 50 determines that the gauge 501 is not displayed, the process of the present flow chart is ended. When the process of S305 or S312 has been performed, since it has already been established that the gauge 501 is displayed on the display unit 28, a transition may be made to the process of S314 without performing the process of S313.

In S314 to S316, a determination is made as to whether or not a condition for erasing the display of the gauge 501 has been satisfied.

In S314, the system control unit 50 determines whether or not the respective operation members of the operating unit 70 other than the touch bar 82 have been operated. This determination is performed in order for the system control unit 50 to hide the gauge 501 when the respective operation members of the operating unit 70 other than the touch bar 82 are operated. When the system control unit 50 determines that the respective operation members of the operating unit 70 other than the touch bar 82 have been operated, the system control unit 50 makes a transition to S317, but when the system control unit 50 determines that the respective operation members of the operating unit 70 other than the touch bar 82 have not been operated, the system control unit 50 makes a transition to S315. For example, the ISO sensitivity can also be changed by a rotational operation of the main electronic dial 71. In this case, when an operation has been performed with respect to the main electronic dial 71, the system control unit 50 changes the setting value of ISO sensitivity and, at the same time, erases the display of the gauge 501 and hides the gauge 501. In other words, when an operation for changing (setting) a setting item that can be changed (set) by a slide operation and a tap operation with respect to the touch bar 82 is performed using another operation member, the system control unit 50 hides the gauge 501.

In S315, the system control unit 50 determines whether or not the touch bar 82 is in a touch-off (non-operation) state. When the system control unit 50 determines that the touch bar 82 is in a touch-off state, the system control unit 50 makes a transition to S316, but when the system control unit 50 determines that the touch bar 82 is not in a touch-off state, the system control unit 50 ends the process of the flow chart.

In S316, the system control unit 50 determines whether or not a prescribed period of time (a prescribed time) or more such as two seconds or more has elapsed without having a touch operation performed with respect to the touch bar 82 after the touch bar 82 had changed to the touch-off state. When the system control unit 50 determines that the prescribed period of time or more has elapsed, the system control unit 50 makes a transition to S317, but when the system control unit 50 determines that the prescribed period of time or more has not elapsed, the process of the present flow chart is ended. In this case, the system control unit 50 makes the determination based on an elapsed time from touch-off that is a state where a finger of the user or a pen is separated from the touch bar 82. However, the system control unit 50 may make the determination based on an elapsed time from a latest slide operation or a latest tap operation with respect to the touch bar 82. The prescribed period of time may be a period of time set by the user in advance, a longer period of time may be set for an older or younger user, or a longer period of time may be set when a frequency of misoperations by the user with respect to the touch bar 82 during a prescribed period of time in the past is higher. In other words, with respect to a user who performs operations more slowly, the display unit 28 may display the gauge 501 for a longer period of time to ensure that the user comprehends a setting change.

In S317, the system control unit 50 hides the gauge 501. In other words, the system control unit 50 hides the gauge 501 once a prescribed period of time or more in which a slide operation or a tap operation has not been performed with respect to the touch bar 82 elapses. Alternatively, the system control unit 50 hides the gauge 501 once a prescribed period of time or more elapses after detection of a last contact between a finger of the user or a pen and the touch bar 82. In addition, the system control unit 50 also hides the gauge 501 when an operation with respect to the operating unit 70 other than the touch bar 82 is performed. Accordingly, a situation where displaying the gauge 501 interferes with viewing (confirming) of a display image by the user can be prevented. It should be noted that, naturally, in S317, the system control unit 50 does not hide elements other than the gauge 501. In other words, the system control unit 50 does not hide the LV image and the like displayed on the display unit 28. Therefore, the process in S317 differs from a so-called screen saver or automatic shutdown.

In the above embodiment, an example has been described in which the system control unit 50 sequentially changes a setting of a specific setting object (a setting of ISO sensitivity) by a prescribed resolution (for example, by ⅓ steps) in accordance with a slide operation, and the system control unit 50 changes a setting value of the same specific setting object to a specific setting in accordance with a tap operation. However, the present embodiment is not limited to this example and can also be applied to a case where the system control unit 50 changes, in accordance with a tap operation, a setting value by a coarser resolution than a resolution of a setting value that can be changed by sliding. For example, by adopting ⅓ steps as a minimum change unit of the setting value of ISO sensitivity in accordance with a slide operation, the system control unit 50 sequentially shifts the setting value by ⅓ steps in accordance with each slide operation. Alternatively, the system control unit 50 sets the ISO sensitivity to a value lower by one step than a current setting value in accordance with left tapping and sets the ISO sensitivity to a value higher by one step than the current setting value in accordance with right tapping. The present embodiment can also be applied to function assignments with respect to such operation types. In addition, while an example of tap operations has been described in which left tapping and right tapping are distinguished from each other as different operation types in accordance with positions with respect to the touch bar 82, a tap operation is not limited thereto. Only one type of tapping may be considered, and taps performed with respect to the touch bar 82 may be handled as tapping representing an identical operation type (no distinction between left and right) regardless of a touched position on the touch bar 82.

In addition to the digital camera 100, the present embodiment can also be applied to electronic apparatuses such as a personal computer, a smartphone, a tablet terminal, and a VR (Virtual Reality) apparatus. Therefore, an operation other than a slide operation may be adopted as long as the operation enables one setting to be selected from a plurality of setting candidates, and the operation may be an operation in accordance with a member provided in an electronic apparatus such as an operation involving changing a position of a lever, an operation involving rotating a wheel, or an operation involving tilting the electronic apparatus. In addition, an operation other than a tap operation may be adopted as long as the operation enables one setting determined in advance so as to correspond to the operation can be configured, and the operation may be an operation in accordance with a member provided in an electronic apparatus such as an operation involving depressing a prescribed button, an operation involving switching between on and off of a prescribed switch, or an operation involving shaking the electronic apparatus up and down. Therefore, for example, the present embodiment can be applied to a VR apparatus by adopting a configuration in which tilting a headset in a prescribed direction causes one setting to be selected from setting candidates in accordance with a tilt angle while shaking (such as back-and-forth vibrations) of the headset causes one setting determined in advance to be configured. Due to instability of a position of a headset (goggles) in such a VR apparatus, an operation by the headset often results in a misoperation by a user. Therefore, with such a VR apparatus, an effect of the present embodiment of making a user aware of a misoperation is enhanced in comparison with other electronic apparatuses. Furthermore, for example, the present embodiment can also be applied to an electronic apparatus provided with a sensor for tracking eye movement of a user, in which one setting can be configured when the user views, for a certain period of time T1 or longer, one setting candidate among setting candidates displayed on a screen, and a setting determined in advance is configured when the user closes his/her eyes for a certain period of time T2 or longer.

In addition, in the present embodiment, since a slide operation and a tap operation are performed with respect to the touch bar 82 which is the same operation member, for example, when holding the digital camera 100 with a hand, both a slide operation and a tap operation can be readily performed by a finger of the hand. Furthermore, since the touch bar 82 is a linear operation member, only slide operations in a direction of the linear shape (a horizontal direction) are physically possible (allowed). Therefore, the user can perform a slide operation and a tap operation without having to visually confirm a relationship between the touch bar 82 and a finger. However, the present embodiment is not limited thereto and different operation members may be respectively used for a slide operation and a tap operation. Moreover, in the present embodiment, since a slide operation and a tap operation are performed with respect to the touch bar 82 which is not a display unit such as the display unit 28 or the finder outer display unit 43, the user can perform a slide operation and a tap operation without interference with screen display. However, the present embodiment is not limited thereto and, for example, a slide operation and a tap operation can be performed with respect to the display unit 28.

As described above, when changing a setting of an identical setting item by a second operation during a period which a gauge after performing a first operation is being displayed, by displaying the setting changed by the second operation on the gauge, a user can more readily comprehend that a change to the setting has been made. In addition, since the gauge is only displayed during a prescribed period of time after a time point at which a touch bar is switched to a touch-off state, interference with visual confirmation of an image by the user can be suppressed.

It should be noted that the various controls described above as controls to be performed by the system control unit 50 may be carried out by one piece of hardware, or a plurality of pieces of hardware (for example, a plurality of processors or circuits) may control an entire electronic apparatus (an entire apparatus) by sharing processes.

In addition, while the present invention has been described in detail based on a preferred embodiment thereof, the present invention is not limited to the specific embodiment and various modes that do not constitute departures from the scope of the invention are also included in the present invention. Furthermore, the embodiment described above simply represents an example of the present invention and the embodiment can also be combined with other embodiments.

In addition, while an example in which the present invention is applied to a digital camera has been described in the embodiment presented above, the present invention is not limited to this example and can be applied to any electronic apparatus that enables a setting of an identical setting item to be configured by a plurality of operations. Specifically, the present invention can be applied to a personal computer, a PDA, a mobile phone terminal, a mobile image viewer, a printer apparatus equipped with a display, a digital photo frame, a music player, a game device, an electronic book reader, a VR apparatus, and the like.

In addition, besides an electronic apparatus main body, the present invention can also be applied to a control apparatus which remotely controls an electronic apparatus (including a network camera) by communicating with the electronic apparatus via wired or wireless communication. Examples of an apparatus which remotely controls an electronic apparatus include a smartphone, a tablet PC, and a desktop PC. An electronic apparatus can be remotely controlled by notifying the electronic apparatus of commands for performing various operations and settings from a control apparatus based on operations and processes performed by the control apparatus. Furthermore, the control apparatus may be configured to be capable of receiving a live view image photographed by the electronic apparatus via wired or wireless communication and displaying the live view image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125430, filed on Jun. 29, 2018, which is hereby incorporated by reference herein in its entirety.

What is claimed is:

1. An electronic apparatus comprising:
a memory and at least one processor and/or at least one circuit to perform the operations of the following units:
a display controlling unit configured to control
to display a group of candidates representing a plurality of candidates of settings with respect to a specific setting object on a display unit in response to a first type of operation which is an operation to a specific operation member which is different from the display unit by a user and
to hide the group of candidates in a case where a prescribed condition is satisfied; and
a control unit configured to change a setting of the specific setting object, in response to the first type of operation, by an amount of change in accordance with an operation amount of the first type of operation from the setting prior to the change, and
in a case where the group of candidates is displayed, in response to a second type of operation which is an operation to the specific operation member by a user that differs from the first type of operation, change a setting of the specific setting object to a specific setting which is associated with the second type of operation in advance and is not based on the setting prior to the change, and update the display of the group of candidates so as to correspond to the changed setting, wherein
the specific operation member is a touch operation member capable of detecting a touch operation on an operation surface,
the first type of operation is a slide operation involving touching the operation surface and moving a touched position,
the second type of operation is a tap operation involving touching the operation surface and releasing the touch without moving a touched position, and
the prescribed condition includes a lapse of a predetermined period of time without a touch to the specific operation member.

2. The electronic apparatus according to claim 1, wherein the control unit is further configured to control such that the group of candidates is not displayed, in a case where the group of candidates is not displayed, even if the second type of operation is performed.

3. The electronic apparatus according to claim 1, wherein the display controlling unit is further configured to control
to superimpose and display the group of candidates on an image in response to the first type of operation, and
to hide the group of candidates while continuously displaying the image in a case where the prescribed condition is satisfied.

4. The electronic apparatus according to claim 1, wherein the prescribed condition includes both the first type of operation and the second type of operation not having been performed during a predetermined period of time.

5. The electronic apparatus according to claim 1, wherein the prescribed condition includes a third type of operation which indicates to hide the group of candidates having been performed.

6. The electronic apparatus according to claim 1, further comprising:
an image sensor; and
an eyepiece finder, wherein
in a state where an eye is in contact with the eyepiece finder, the first type of operation and the second type of operation to the specific operation member can be performed by a finger of a hand holding a grip portion of the electronic apparatus, and
the display controlling unit is further configured to control to superimpose and display the group of candidates on a live view image being captured by the image sensor on a display inside the eyepiece finder.

7. The electronic apparatus according to claim 1, wherein the specific operation member comprises a capacitive-system touch sensor.

8. The electronic apparatus according to claim 1, wherein the specific operation member is positioned where the specific operation member can be readily operated by a thumb of a hand holding the electronic apparatus.

9. The electronic apparatus according to claim 8, further comprising:
a grip portion configured to be gripped by the hand; and
a thumb rest portion where the thumb is to be positioned when holding the electronic apparatus by gripping the grip portion,
wherein the specific operation member is a physical button that is positioned adjacent to the thumb rest portion.

10. The electronic apparatus according to claim 1, wherein
the electronic apparatus is a digital camera.

11. The electronic apparatus according to claim 1 wherein the control unit is further configured to control
to change the setting of the specific setting object to the specific setting in response to the second type of operation regardless of the setting prior to the change, and
to change the setting of the specific setting object from the specific setting in response to the first type of operation just after the second type of operation.

12. The electronic apparatus according to claim 1, wherein
the control unit is further configured to control
to change a setting of the specific setting object in response to the first type of operation by a first resolution, and
to change the setting of the specific setting object in response to the second type of operation by a second resolution that is coarser than the first resolution.

13. The electronic apparatus according to claim 1, wherein
the specific setting object is any of ISO sensitivity, shutter speed, and aperture.

14. The electronic apparatus according to claim 1, wherein
the specific setting object is an image to be displayed among a plurality of images.

15. The electronic apparatus according to claim 1, wherein
the group of candidates is a scale display in which a plurality of setting candidates are lined up.

16. A control method for an electronic apparatus, comprising
a display-controlling step and a control step, the display-controlling step including
controlling to display a group of candidates representing a plurality of candidates of settings with respect to a specific setting object on a display unit in response to a first type of operation which is an operation to a specific operation member which is different from the display unit by a user and
controlling to hide the group of candidates in a case where a prescribed condition is satisfied; and
the control step including changing a setting of the specific setting object in response to the first type of operation, by an amount of change in accordance with an operation amount of the first type of operation from the setting prior to the change and
in a case where the group of candidates is displayed, in response to a second type of operation which is an operation to the specific operation member by a user that differs from the first type of operation, changing a setting of the specific setting object to a specific setting which is associated with the second type of operation in advance and is not based on the setting prior to the change, and updating the display of the group of candidates so as to corresponding to the changed setting, wherein
the specific operation member is a touch operation member capable of detecting a touch operation on an operation surface,
the first type of operation is a sliding operation involving touching the operation surface and moving a touched position,
the second type of operation is a tapping operation involving touching the operation surface and releasing the touch without moving a touched position, and
the prescribed condition includes determining a lapse of a predetermined period of time without a touch to the specific operation member.

17. A non-transitory computer readable medium that stores a program, wherein the program causes a computer to execute a display-controlling step and a control step, the display-controlling step including
controlling to display a group of candidates representing a plurality of candidates of settings with respect to a specific setting object on a display unit in response to a first type of operation which is an operation to a specific operation member which is different from the display unit by a user and
controlling to hide the group of candidates in a case where a prescribed condition is satisfied; and
the control step including changing a setting of the specific setting object in response to the first type of operation, by an amount of change in accordance with an operation amount of the first type of operation from the setting prior to the change and in a case where the group of candidates is displayed, in response to a second type of operation which is an operation to the specific operation member by a user that differs from the first type of operation, changing a setting of the specific setting object to a specific setting which is associated with the second type of operation in advance and is not based on the setting prior to the change, and updating the display of the group of candidates so as to corresponding to the changed setting, wherein the specific operation member is a touch operation member capable of detecting a touch operation on an operation surface, the first type of operation is a sliding operation involving touching the operation surface and moving a touched position, the second type of operation is a tapping operation involving touching the operation surface and releasing the touch without moving a touched position, and the prescribed condition includes determining a lapse of a predetermined period of time without a touch to the specific operation member.

* * * * *